UNITED STATES PATENT OFFICE

LEOPOLD LASKA AND OSKAR HALLER, OF OFFENBACH-ON-THE-MAIN, GERMANY, AS-
SIGNORS TO GENERAL ANILINE WORKS, INC., OF NEW YORK, N. Y., A CORPORATION
OF DELAWARE

ARYLAMIDES OF 3-HYDROXY-PHENYL-ARYL-AMINE-CARBOXYLIC ACIDS AND PROCESS OF MAKING SAME

No Drawing. Application filed February 20, 1930, Serial No. 430,130, and in Germany February 27, 1929.

The present invention relates to new aryl-amides of 3-hydroxy-phenylarylamine carboxylic acids which correspond probably to the general formula:

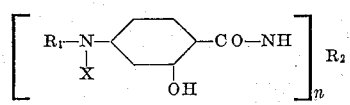

wherein $R_1$ means a radical of the benzene series, $R_2$ any aromatic radical, X means hydrogen or an acyl-group and $n$ the number 1 or 2, and to a process of making same.

The process being the object of the present invention comprises condensing in the presence of an acid condensing agent an aryl-amino-phenol-carboxylic acid of the probable general formula:

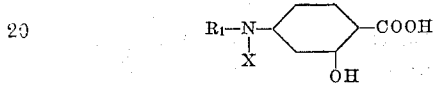

wherein X and $R_1$ have the above signification, which is obtainable by treating the corresponding arylamino-phenol with carbonic acid under pressure (see U. S. application Serial No. 407,274, filed November 14, 1929) and acylating advantageously the carboxylic acid thus produced, with an arylamine of the general formula:

$$(H_2N)_n R_2$$

wherein $n$ and $R_2$ have the above signification whereto a diluent may be admixed.

As arylamino-phenol-carboxylic acids suitable for this process may be named, for instance, 3-phenylamino-phenol-carboxylic acid and its halogen-, alkyl-, alkoxy- or aryloxy-derivatives having these groups attached to the phenylamino radical, which compounds are described in U. S. application Serial No. 407,274, filed November 14, 1929.

Appropriate arylamines are, for instance, aniline, its substitution products containing halogen-, alkyl-, alkoxy- or nitro-groups or simultaneously several of these groups, furthermore amino-phenols, amino-cresols, amino-naphthols, amino-anthraquinones, diamino-naphthalenes, diamino-diaryls.

In the case of using diamino-compounds one or two molecular proportions of the carboxylic-acid may be subjected to the action of the diamine.

Those of the new arylamides are of a special value which correspond to the propable general formula:

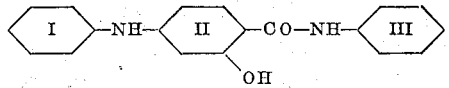

wherein the benzene nucleus signified by I contains halogen-, alkyl-, alkoxy- or aryloxy-groups or several of these groups and the nucleus signified by III may contain halogen, alkyl-, alkoxy- or nitro-groups or several of these groups.

When the compounds obtained by this process contain an acyl-group (X of the above formulæ being acyl), this acyl-group may be split off by an after-treatment with saponifying means.

The new compounds thus produced are distinguished by a great affinity to the vegetable fiber being manifold that of the corresponding aryl-amides of salicylic acid. For this reason they represent valuable intermediates for the production of dyestuffs.

In order to further illustrate our invention the following examples are given, the parts being by weight and all temperatures in centigrade degrees, but it is however to be understood, that our invention is not limited to the particular products or reacting conditions mentioned therein:—

Example 1

22.9 parts of 3-hydroxy-diphenylamine-carboxylic acid, obtainable according to the example of U. S. application Serial No.

407,274, of 1929, are heated in 300 parts of toluene to 60°. Thereto 9.3 parts of aniline are added. At 60–70° 6 parts of phosphorous trichloride are allowed to run in and

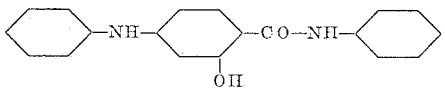

the whole is heated to boiling for about 3 hours until the evolution of hydrochloric acid has ceased. The condensation product is purified by dissolving it in a dilute caustic soda lye and by precipitating with carbonic acid. When recrystallized from xylene the new 3-hydroxy-diphenylamine-carboxylic acid anilide of the probable formula:

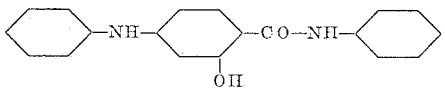

represents colorless glittering needles melting at 186° (uncorrected).

Example 2

22.9 parts of 3-hydroxy-diphenylamine-carboxylic acid are treated with 14.3 parts of 2-amino-naphthalene in 300 parts of xylene with the addition of 6 parts of phosphorus trichloride and the reaction product is purified in the manner described in Example 1. The β-naphthylamide of 3-hydroxy-diphenylamine-carboxylic acid of the probable formula:

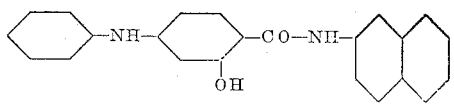

crystallizes from chloro-benzene in colorless needles melting at 208° (uncorrected).

Example 3

22.9 parts of 3-hydroxy-diphenylamine-carboxylic acid are likewise condensed with 12.2 parts of dianisidine in the presence of 300 parts of chloro-benzene and 6 parts of phosphorus trichloride. The new product isolated as above described represents when recrystallized from ortho-dichloro-benzene a reddish colored amorphous powder melting above 340° (uncorrected). It corresponds to the probable formula:

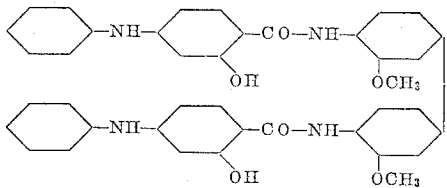

Example 4

22.9 parts of 3-hydroxy-diphenylamine-carboxylic acid, 7.9 parts of 1.5-diamino-naphthalene, 6 parts of phosphorus trichloride and 300 parts of chloro-benzene are treated as described in the foregoing examples. The arylamide thus obtained corresponds probably to the formula:

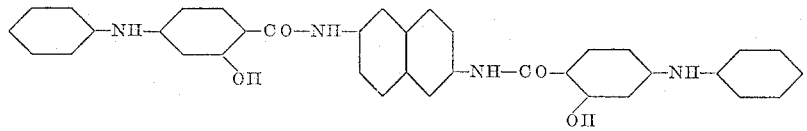

It crystallizes from nitro-benzene in nearly colorless small needles melting at 293° (uncorrected).

Example 5

26.4 parts of 3-hydroxy-4'-chloro-diphenylamine-carboxylic acid and 11 parts of meta-aminophenol are dissolved at 60–70° in 300 parts of dimethylaniline. Then 6 parts of phosphorus trichloride are added at this temperature and the mass is maintained at 120° for 8–10 hours. The reaction product is introduced while stirring into an excess of dilute hydrochloric acid. The residue is washed and freed from dimethylaniline, if any, by steam distillation after being rendered alkaline with a soda solution. The remaining 3-hydroxy-4'-chloro-diphenylamine-carboxylic acid meta-hydroxy-anilide of the probable formula

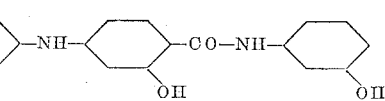

crystallizes from glacial acetic acid as sand-like powder melting at 210–212° (uncorrected).

Example 6

To a mixture of 132 parts of 3-hydroxy-4'-chloro-diphenylamine-carboxylic acid, 61.5 parts of 6-amino-3-hydroxy-1-methyl-benzene and 1000 parts of toluene, 30 parts of phosphorus trichloride are slowly introduced at 60–70°. Then the reaction mass is warmed to 110° for about 8 hours, thereafter rendered alkaline with soda solution and freed from toluene by steam distillation. The remaining para-hydroxy-ortho-methyl-anilide of 3-hydroxy-4'-chloro-diphenylamine-carboxylic acid is dissolved for purification in a caustic soda lye, filtered and precipitated by means of carbonic acid. It is easily soluble in caustic soda lye, very difficultly soluble, even in the hot, in most of the organic solvents. It corresponds to the probable formula:

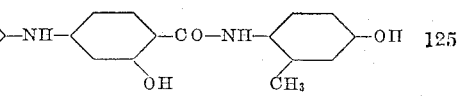

Example 7

24.3 parts of 3-hydroxy-2'-methyl-diphenylamine-carboxylic acid, 11 parts of paraamino-phenol, 6 parts of phosphorus trichloride and 500 parts of toluene are condensed as described above. The formed para-hydroxy-anilide of 3-hydroxy-2'-methyl-diphenylamine-carboxylic acid of the probable formula:

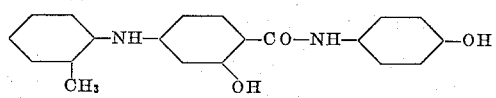

shows when crystallized from xylene the melting point 230–231 (uncorrected).

Example 8

78 parts of the sodium salt of 3-hydroxy-diphenylamine-carboxylic acid and 46 parts of para-nitro-aniline are mixed with 750 parts of xylene and then gradually with 20 parts of phosphorus trichloride. The temperature is kept at 110° for some hours. Then the mass is rendered alkaline with soda-solution, the xylene is blown off by means of steam and the reaction product is purified by dissolving it in caustic soda lye and precipitating with carbonic acid. The new para-nitro-anilide of 3-hydroxy-diphenylamine-carboxylic acid of the probable formula:

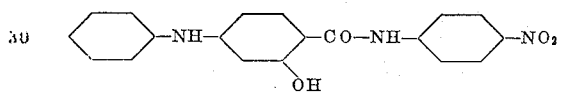

crystallizes from glacial acetic acid in yellowish green needles melting at 211–212°.

Example 9

76.3 parts of 3-hydroxy-diphenylamine-carboxylic acid and 120 parts of thionyl-chloride are introduced into 1000 parts of ligroine and the mixture is heated to boiling until it is dissolved. Then the ligroine and the excess of thionyl-chloride are distilled off in vacuo. The residue is mixed with 750 parts of toluene and 35.7 parts of ortho-toluidine and the mixture is boiled until the evolution of hydrochloric acid has ceased. The mass is mixed with soda-solution until being alkaline and freed from toluene by steam. The reaction product is purified as described above. It represents the ortho-toluidide of 3-hydroxy-diphenylamine-carboxylic acid of the probable formula:

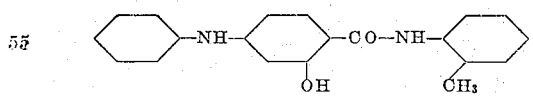

and crystallizes from glacial acetic acid in leaflets melting at 185°.

Example 10

305.5 parts of N-acetyl-3-hydroxy-4'-chloro-diphenylamine-carboxylic acid, prepared by longer boiling 3-hydroxy-4'-chloro-diphenylamine-carboxylic acid with an excess of acetic acid anhydride, and 138 parts of meta-nitro-aniline are introduced into 3000 parts of ortho-dichloro-benzene. At 60–70° 60 parts of phosphorus trichloride are gradually dropped in. The mass is maintained at 110° for some hours, then mixed with an excess of double-normal caustic potash-lye. Ortho-dichloro-benzene is removed by introducing steam and the remaining filtered solution is saturated with carbonic acid. Thereby meta-nitro-anilide of 3-hydroxy-4'-chloro-diphenyl-amine-carboxylic acid precipitates. It corresponds to the probable formula:

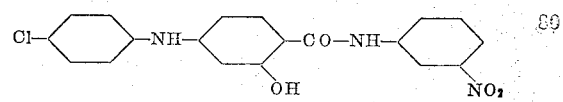

It crystallizes from ortho-dichloro-benzene and melts at 203°.

Example 11

Into a mixture of 263.5 parts of 3-hydroxy-4'-chloro-diphenylamine-carboxylic acid, 138 parts of 4-nitroaniline and 1500 parts of toluene, 60 parts of phosphorus trichloride are gradually introduced at 60–70°. Then the temperature is maintained at 110° for several hours until the evolution of hydrochloric acid has ceased. The reaction mass is rendered alkaline by means of soda and freed from toluene by steam. The formed para-nitro-anilide of 3-hydroxy-4'-chloro-diphenylamine-carboxylic acid is purified as described above. It corresponds to the probable formula:

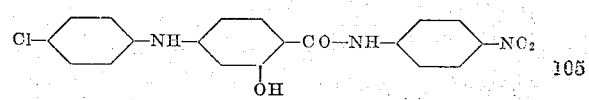

and melts when recrystallized from o-dichlorobenzene at 229°.

Example 12

A mixture of 263.5 parts of 3-hydroxy-4'-chloro-diphenylamine-carboxylic acid, 172.5 parts of 6-chloro-4-nitro-aniline and 1500 parts of xylene is treated with 60 parts of phosphorus trichloride and the reaction mass is worked up as described in the foregoing examples.

The ortho-chloro-para-nitro-anilide of 3-hydroxy-4'-chloro-diphenylamine-carboxylic acid thus formed corresponds to the probable formula:

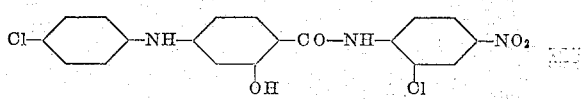

It melts when recrystallized from glacial acetic acid or from pyridine at 240°.

The following table shows the properties of some further arylamides prepared by the present process:

| Arylamide prepared from: | Recrystallized from: | Melting point: |
|---|---|---|
| 3-hydroxydiphenylamine-carboxylic acid +p-toluidine | Glacial acetic acid | 196° |
| +o-anisidine | Benzene | 123–125° |
| 3-hydroxy-2'-methyldiphenyl-amine-carboxylic acid | | |
| +aniline | Xylene | 174° |
| +p-nitroaniline | Chlorobenzene | 182° |
| +β-naphthylamine | Chlorobenzene | 164° |
| 3-hydroxy-3'-methyldiphenyl-amine-carboxylic acid | | |
| +aniline | Chlorobenzene | 165–166° |
| +p-nitroaniline | Chlorobenzene | 218° |
| +β-naphthylamine | Chlorobenzene | 188° |
| 3-hydroxy-4'-methyldiphenyl-amine-carboxylic acid | | |
| +aniline | Chlorobenzene | 226–227° |
| +m-aminophenol | Xylene | 198–199° |
| +p-aminophenol | Xylene | 144–145° |
| +p-nitroaniline | Chlorobenzene | 207° |
| 3-hydroxy-2'-chlorodiphenyl-amine-carboxylic acid | | |
| +aniline | Chlorobenzene | 176–177° |
| +m-aminophenol | Precipitated from its caustic soda-solution | 166–167° |
| +p-aminophenol | Do. | 160–162° |
| +o-anisidine | Xylene | 165–167° |
| +p-nitroaniline | Chlorobenzene | 184° |
| 3-hydroxy-3'-chlorodiphenyl-amine-carboxylic acid | | |
| +aniline | Chlorobenzene | 160° |
| +o-anisidine | Do. | 187° |
| +p-nitroaniline | Chlorobenzene | 218° |
| +β-naphthylamine | Chlorobenzene | 206–207° |
| 3-hydroxy-4'-chlorodiphenyl-amine-carboxylic acid | | |
| +aniline | Glacial acetic acid | 222° |
| +o-toluidine | Glacial acetic acid | 201° |
| +p-toluidine | Dichlorobenzene | 223° |
| +o-chloroaniline | Chlorobenzene | 198° |
| +p-chloroaniline | Chlorobenzene | 188–190° |
| +2.5-dichloroaniline | Chlorobenzene | 220–221° |
| +4-chloro-2-aminotoluene | Xylene | 197° |
| +5-chloro-2-aminotoluene | Xylene | 183° |
| +p-aminophenol | Precipitated from its caustic soda-solution | 185–186° |
| +o-anisidine | Chlorobenzene | 142° |
| +5-chloro-2-amino anisole | Xylene | 178–180° |
| +p-anisidine | Chlorobenzene | 178–179° |
| +p-phenetidine | Pyridine | 165° |
| +2-chloro-4-nitroaniline | Pyridine | 240° |
| +5-nitro-2-aminotoluene | Xylene | 203–204° |
| +4-nitro-2-amino-anisole | Glacial acetic acid | 239–240° |
| +β-naphthylamine | Dichlorobenzene | 237–239° |
| +1-aminoanthraquinone | Dichlorobenzene | 240–243° |
| +2-aminoanthraquinone | Precipitated from its caustic soda-solution | 298–299° |
| +1.5-diaminoanthraquinone (half its molecular proportion) | Dichlorobenzene | above 330° |
| +3-amino-carbazole | Dichlorobenzene | 219° |
| 3-hydroxy-2'-methoxydiphe-nylamine-carboxylic acid | | |
| +aniline | Dichlorobenzene | 135° |
| +m-aminophenol | Chlorobenzene | 185° |
| +p-aminophenol | Chlorobenzene | 160° |
| +p-nitroaniline | Chlorobenzene | 215° |
| 3-hydroxy-4'-methoxydiphe-nylamine-carboxylic acid | | |
| +aniline | Chlorobenzene | 190° |
| +p-nitroaniline | Chlorobenzene | 225° |
| 3-hydroxy-4'-phenoxydiphe-nylamine-carboxylic acid | | |
| +p-nitroaniline | Dichlorobenzene | 216° |
| +β-naphthylamine | Chlorobenzene | 184–185° |
| 3-hydroxy-2'.4'-dimethyldi-phenylamine-carboxylic acid | | |
| +aniline | Chlorobenzene | 151° |
| +p-nitroaniline | Chlorobenzene | 184° |
| 3-hydroxy-2'.5'-dimethyl-diphenylamine-carboxylic acid | | |
| +aniline | Chlorobenzene | 152–153° |
| +p-nitroaniline | Chlorobenzene | 207° |
| +β-naphthylamine | Chlorobenzene | 175° |
| 3-hydroxy-2'-methyl-4'-chloro-diphenylamine-carboxylic acid | | |
| +aniline | Chlorobenzene | 167° |
| +p-nitroaniline | Chlorobenzene | 182° |
| +β-naphthylamine | Xylene | 166° |
| 3-hydroxy-2'-methyl-5'-chloro-diphenylamine-carboxylic acid | | |
| +aniline | Xylene | 150° |
| +p-nitroaniline | Chlorobenzene | 229° |
| 3-hydroxy-3'-methyl-4'-chloro-diphenylamine-carboxylic acid | | |

| Arylamide prepared from: | Recrystallized from: | Melting point: |
|---|---|---|
| +aniline | Chlorobenzene | 202° |
| +o-anisidine | Chlorobenzene | 135° |
| +p-anisidine | Chlorobenzene | 215–217° |
| +p-nitroaniline | Dichlorobenzene | 213–214° |
| 3-hydroxy-3'-chloro-4'-methyl-diphenylamine-carboxylic acid | | |
| +aniline | Chlorobenzene | 176° |
| +4-chloro-2-amino-toluene | Xylene | 180° |
| +5-chloro-2-aminotoluene | Xylene | 199° |
| +p-nitroaniline | Chlorobenzene | 255° |
| +β-naphthylamine | Chlorobenzene | 245° |
| 3-hydroxy-3'-methyl-4'-methoxy-diphenylamine-carboxylic acid | | |
| +aniline | Dichlorobenzene | 187° |
| +p-nitroaniline | Chlorobenzene | 244–245° |
| +β-naphthylamine | Chlorobenzene | 188° |
| 3-hydroxy-2'.4'-dichloro-diphenylamine-carboxylic acid | | |
| +aniline | Xylene | 217–218° |
| +p-nitroaniline | Dichlorobenzene | 242–243° |
| +β-naphthylamine | Dichlorobenzene | 182° |
| 3-hydroxy-3'.4'-dichloro-diphenylamine-carboxylic acid | | |
| +aniline | Dichlorobenzene | 188° |
| +p-nitroaniline | Dichlorobenzene | 258–259° |
| 3-hydroxy-3'.4'-dichloro-6'-methyl-diphenylamine-carboxylic acid | | |
| +p-nitroaniline | Chlorobenzene | 280° |

We claim:—

1. Process which comprises condensing in the presence of an acid condensing agent an arylamino-phenol-carboxylic acid of the probable general formula:

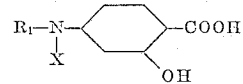

wherein X means hydrogen or an acyl-group and $R_1$ stands for a radical of the benzene series which is obtainable by treating the corresponding arylamino-phenol with carbonic acid and acylating advantageously the carboxylic acid thus produced, with an arylamine of the general formula:

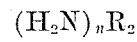

$$(H_2N)_nR_2$$

wherein $R_2$ means any aromatic radical of the benzene, diphenyl, naphthalene or anthraquinone series and $n$ the number 1 or 2.

2. Process which comprises condensing in the presence of an acid condensing agent an arylamino-phenol-carboxylic acid of the probable general formula:

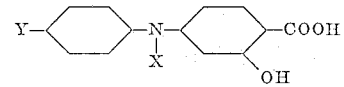

wherein X means hydrogen or an acyl-group and Y stands for alkyl-alkoxy-aryloxy or halogen, which is obtainable by treating the corresponding arylamino-phenol with carbonic acid and acylating advantageously the carboxylic acid thus produced, with an arylamine of the general formula:

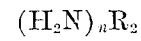

$$(H_2N)_nR_2$$

wherein $R_2$ means any aromatic radical of the benzene, diphenyl, naphthalene or anthraquinone series and $n$ the number 1 or 2.

3. Process which comprises condensing in the presence of an acid condensing agent a 4'-chloro-phenylamino-phenol-carboxylic acid of the probable general formula:

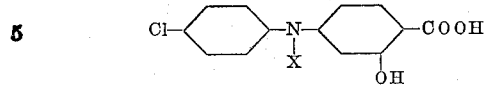

wherein X means hydrogen or an acyl-group, which is obtainable by treating the corresponding arylamino-phenol with carbonic acid and acylating advantageously the carboxylic acid thus produced, with an arylamine of the general formula:

wherein $R_2$ means any aromatic radical of the benzene, diphenyl, naphthalene or anthraquinone series and $n$ the number 1 or 2.

4. As new compounds the arylamides of arylamino-phenol-carboxylic acids corresponding to the probable general formula:

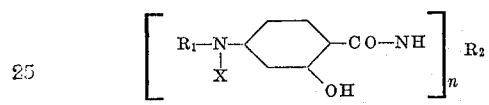

wherein $R_1$ means a radical of the benzene series, $R_2$ any aromatic radical of the benzene, diphenyl, naphthalene or anthraquinone series, X means hydrogen or an acyl-group and $n$ the number 1 or 2 which are obtainable by treating the corresponding arylamino-phenols with carbonic acid, acylating advantageously the carboxylic acids thus produced and condensing with a corresponding arylamine, which compounds are amorphous or crystallized substances, having a definite melting point, difficulty soluble in organic solvents, easily soluble in alkalies, distinguished by a great affinity to the vegetable fiber.

5. As new compounds the arylamides of arylamino-phenol-carboxylic acids corresponding to the probable general formula:

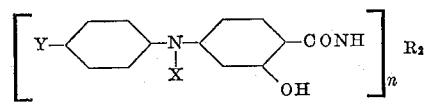

wherein X means hydrogen or an acyl-group, Y means alkyl, alkoxy, aryloxy or halogen, $R_2$ any aromatic radical of the benzene, diphenyl, naphthalene or anthraquinone series and $n$ the number 1 or 2, which are obtainable by treating the corresponding arylamino-phenols with carbonic acid, acylating advantageously the carboxylic acids thus produced and condensing with a corresponding arylamine, which compounds are amorphous or crystallized substances, having a definite melting point, difficulty soluble in organic solvents, easily soluble in alkalies, distinguished by a great affinity to the vegetable fiber.

6. As new compounds the arylamides of arylamino-phenol-carboxylic acids corresponding to the probable general formula:

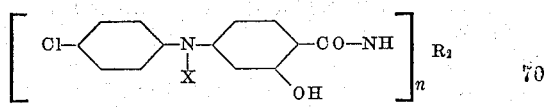

wherein X means hydrogen or an acyl-group, $R_2$ any aromatic radical of the benzene, diphenyl naphthalene or anthraquinone series and $n$ the number 1 or 2, which are obtainable by treating the corresponding 3-(4'-chlorophenylamino)-phenol with carbonic acid, acylating advantageously the carboxylic acids thus produced and condensing with a corresponding arylamine, which compounds are amorphous or crystallized substances, having a definite melting point, difficultly soluble in organic solvents, easily soluble in alkalies, distinguished by a great affinity to the vegetable fiber.

7. As new compounds the arylamides of chloro-phenyl-amino-phenol-carboxylic acids corresponding to the probable general formula:

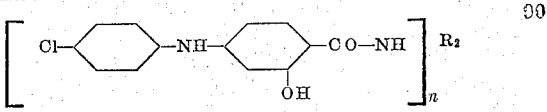

wherein $R_2$ means any aromatic radical of the benzene, diphenyl, naphthalene or anthraquinone series and $n$ the number 1 or 2, which are obtainable by treating the corresponding 3-(4'-chloro-phenylamino)-phenol with carbonic acid and condensing with a corresponding aryl-amine, which compounds are amorphous or crystallized substances, having a definite melting point, difficultly soluble in organic solvents, easily soluble in alkalies, distinguished by a great affinity to the vegetable fiber.

8. As new compounds the arylamides of chloro-phenyl-amino-phenol-carboxylic acids corresponding to the probable general formula:

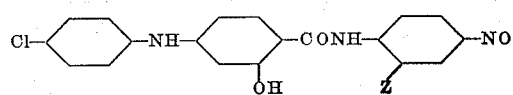

wherein Z means hydrogen, alkyl, alkoxy or chlorine, which are obtainable by treating the corresponding 3-(4'-chloro-phenylamino)-phenol with carbonic acid and condensing with an arylamine of the probable general formula:

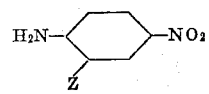

wherein Z has the above signification, which compounds are amorphous or crystallized substances, having a definite melting point, difficultly soluble in organic solvents, easily soluble in alkalies, distinguished by a great affinity to the vegetable fiber.

9. As a new compound the para-nitro-anilide of 4'-chloro-3-hydroxy-diphenyl-amine-carboxylic acid of the probable formula:

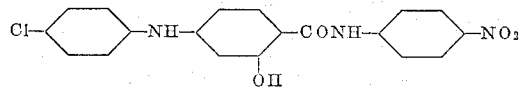

obtainable by treating the corresponding 3-(4'-chloro-phenyl-amino)-phenol with carbonic acid and condensing with 4-nitro-aniline, which compound is a crystallized substance, having its melting point at 229°, difficultly soluble in organic solvents, easily soluble in alkalies, distinguished by a great affinity to the vegetable fiber.

10. As a new compound, the para-chloro-anilide of 4'-chloro-3-hydroxy-diphenyl-amine-carboxylic acid of the probable formula:

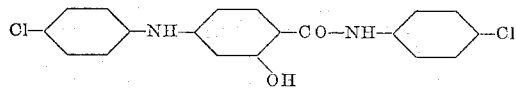

melting when recrystallized from chlorobenzene at 188–190°, difficultly soluble in organic solvents, easily soluble in alkalies, distinguished by a great affinity to the vegetable fiber.

11. As a new compound, the ortho-anisidide of 4'chloro-3-hydroxy-diphenylamine-carboxylic acid of the probable formula:

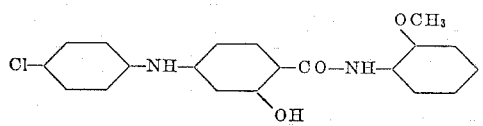

melting when recrystallized from chlorobenzene at 142°, difficultly soluble in organic solvents, easily soluble in alkalies, distinguished by a great affinity to the vegetable fiber.

In testimony whereof, we affix our signatures.

LEOPOLD LASKA.
OSKAR HALLER.